United States Patent [19]

Ohmura

[11] 4,176,488
[45] Dec. 4, 1979

[54] LINE GUIDE RING

[75] Inventor: Ryuichi Ohmura, Shizuoka, Japan

[73] Assignee: Fuji Kogyo Co., Ltd., Shizuoka, Japan

[21] Appl. No.: 846,350

[22] Filed: Oct. 28, 1977

[51] Int. Cl.² ............................................. A01K 87/04
[52] U.S. Cl. ................................................................ 43/24
[58] Field of Search ............................................... 43/24

[56] References Cited

U.S. PATENT DOCUMENTS

| 2,227,868 | 1/1941 | Tengel | 43/24 |
| 2,619,714 | 12/1952 | Dornaus | 43/24 |
| 2,863,252 | 12/1958 | Hettinger | 43/24 |
| 2,914,882 | 12/1959 | Marke | 43/24 |

FOREIGN PATENT DOCUMENTS 525545 5/1931 Fed. Rep. of Germany ............. 43/24
1165788 10/1958 France ............................................. 43/24

Primary Examiner—Nicholas P. Godici
Attorney, Agent, or Firm—Cantor and Singer

[57] ABSTRACT

Disclosed herein is an improved line guide ring for a fishing rod in which a front mounting leg is formed in a position corresponding to the upper surface of the fishing rod, and rear mounting legs are formed in positions corresponding to both sides thereof. Rear supporting legs are provided which are moderately bent from the top of a fixing ring toward both sides of the fishing rod, and are inwardly twisted by 90 degrees. This improved line guide ring affords a strong resisting force to, in particular, a laterally applied force.

1 Claim, 3 Drawing Figures

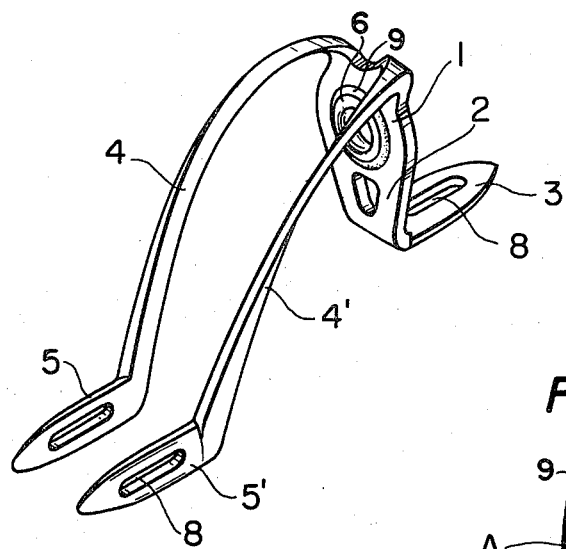
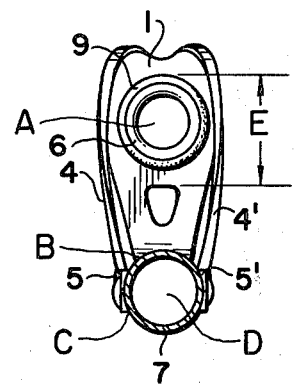
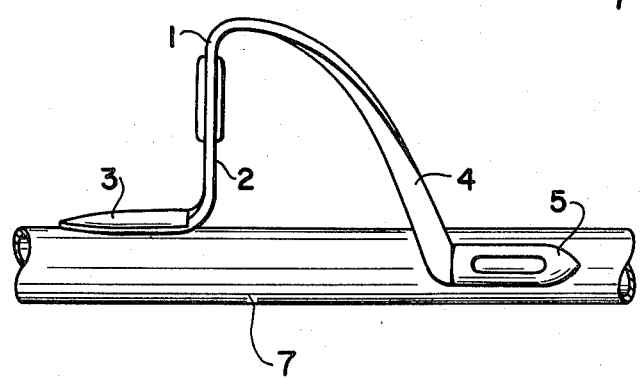

LINE GUIDE RING

BACKGROUND OF THE INVENTION

In general, a line guide ring has supporting legs protruding from both sides of a metallic guide ring; said legs being provided at their lower ends with horizontally extending fixed legs.

Accordingly, even though a line guide ring of this type is formed of a sturdy material capable of landing a big fish, such a ring cannot withstand a force applied laterally; therefore, it is not employed. In order to overcome such a defect, some methods have been presented to attach the two fixed legs in the front and in the rear to each side of the fishing rod in such a way that the rod is sandwiched therebetween.

These methods afford a somewhat improved strength counteracting a force applied laterally, but a reduced strength counteracting a force applied in the vertical direction.

SUMMARY OF THE INVENTION

The present invention relates to a line guide ring for fishing rods, more particularly to a line guide ring capable of withstanding a heavy load applied by way of a fishing line, and has for its object to overcome the aforesaid defect and thereby provide a strong resisting force with respect to a laterally applied force.

BRIEF DESCRIPTION OF THE ACCOMPANYING DRAWINGS

While the invention is particularly pointed out and distinctly claimed in the concluding portion of the specification, a preferred embodiment is discribed in the following detailed description which may be best understood when read in connection with the accompanying drawings in which:

FIG. 1 is a perspective view of one preferred embodiment of the present invention;

FIG. 2 is a side view thereof; and

FIG. 3 is a rear view thereof.

DETAILED DESCRIPTION OF THE INVENTION

The present invention is more concretely illustrated with respect to a sturdy line guide ring normally called a boat guide, referring to the drawings in which numeral 1 stands for a fixing ring; 2 for a front supporting leg; 3 for a front mounting foot; 4 and 4' for rear supporting legs; and 5 and 5' for rear mounting feet. These members are integrally formed by punching a steel plate having a thickness in the order of 1 to 2 mm. These members thus fabricated are very sturdy since their widths are wider than those of a line guide ring of a conventional type, and they are prepared from a thicker material.

Referring now to the respective members, a hard guide ring 6 is fitted into a shock ring 9 which is fitted into the fixing ring 1, the lower half portion of which extends to form a supporting legs, which is, in turn, permitted to extend further in the forward direction to define a mounting foot 3. In this case, the fixing ring 1 and supporting leg 2 are substantially vertically formed so as to cope with a force in the vertical direction which is applied to the fixing ring due to the tensible force of a fishing line.

The rear supporting legs 4, 4' are designed to cope with a force applied horizontally by a fishing line, and not to apply an impact force directly to the fixing ring. These legs of rod-like relatively wide configuration are moderately bent from the top of the fixing ring 1 toward the mounting feet 5, 5', and are inwardly twisted by 90 degrees. The mounting feet 5, 5' are positioned to correspond in location with the side faces of a fishing rod 7. An aperture generally indicated by 8 is provided so as to lessen the weights of the mounting feet, and is utilized to fill adhesives when mounting said feet to the fishing rod.

A main characteristic feature of the present invention lies in that the rear supporting legs 4, 4' are shaped to rod-like configuration of large width, and are inwardly twisted by 90 degrees from the fixing ring 1 toward the mounting feet 5, 5'; and a single mounting foot 3 is positioned to correspond in location with the upper surface of the fishing rod 7.

The thus fabricated line guide ring copes with a force urging the fixing ring in the vertical direction due to the tensible force of a fishing line and a force having a tendency to push the same down in the lateral direction. In addition, whenever a force (A) in the lateral direction is applied to the fixing ring 1, the ring has a tendency to rotate centering around a point (B) on the front mounting foot 3 and a point (C) on the rear mounting foot 5, or the rear mounting feet 5, 5' have a tendency to slidably move centering around the center point B of both. That is, the fixing ring 1 is supported not only a fastening force of each of these mounting feet 3, 5 and 5' with respect to the fishing rod 7, but also by, say, a three-point support comprising the fixing ring, front mounting foot 3 and rear mounting feet 5, 5'. More specifically, whenever the fixing ring 1 has a tendency to rotate around point (B) in the direction (A), a rear mounting foot 5 is urged against the fishing rod as a matter of course. On the other hand, whenever the mounting feet 5 and 5' have a tendency to rotate along the peripheral surface of the fishing rod, the line guide ring is twisted between said feet and the front mounting foot 3, with the result that the line guide ring raises its resistance to a laterally applied force.

Since the rear mounting legs 4, 4' are permitted to protrude from the top of the fixing ring 1, their tops are positioned in a position higher than the upper edge of the fixing ring. Therefore, when an impact force is applied to the line guide ring (when the line guide ring strikes against a rock upon casting the fishing rod from the practical point of view), the impact force is received by the rear supporting legs so that the fixing ring and the eye ring attached thereto are prevented from suffering any damage.

As clearly shown in FIG. 3, the rear supporting legs 4, 4' are bent to define a circle centering around the guide ring 6 in such a way that the circle is sufficiently larger than the guide ring and is drawn so as to incline them by about 45 degrees, whereby it is unlikely that the line passing from a reel coils itself round the fixing ring. Further, the support legs are twisted toward the guide ring, and hence, have an effect in smoothly directing the line toward the guide ring.

As mentioned in detail as above, the line guide ring of the present invention has a strong resisting force with respect to a force applied by way of the fishing line, and is, therefore, suited for a heavy duty boat guide especially.

Although a preferred embodiment of the present invention has been shown in the foregoing specification, it will, of course, be understood that various modifications and changes may be made therein without departing from the invention. It is, therefore, intended that the following claims cover all such modifications and changes as may fall within the true spirit and scope of the present invention.

What is claimed is:

1. A line guide for a fishing rod comprising a fixing ring; a single front supporting leg terminating at its distal end in a front mounting foot adapted to be fitted to the top of a fishing rod; a pair of rear supporting legs terminating at their distal ends in rear mounting feet adapted to be fitted to opposite sides of the fishing rod, said rear supporting legs being moderately bent from the top of the fixing ring toward both sides of the fishing rod, being inwardly twisted by 90 degrees, and protruding from the top of the fixing ring to locate the tops thereof at a position higher than the upper edge of the fixing ring; said fixing ring, supporting legs, and mounting feet being integral and formed by punching from a single metal plate, and a guide ring mounted in said fixing ring.

* * * * *